United States Patent [19]
Passero

[11] Patent Number: 5,399,063
[45] Date of Patent: Mar. 21, 1995

[54] SINGLER FOR ADVANCING AND DIVIDING STACKED ARTICLES

[75] Inventor: Adolfo Passero, Caserta, Italy

[73] Assignee: Alcatel S.p.A., Milan, Italy

[21] Appl. No.: 135,067

[22] Filed: Oct. 12, 1993

[30] Foreign Application Priority Data

Oct. 9, 1992 [IT] Italy .................. MI92 A 2326

[51] Int. Cl.[6] .................................. B65G 59/12
[52] U.S. Cl. .................. 414/798.9; 414/786; 198/416
[58] Field of Search ........... 414/786, 798.9; 271/10, 271/150; 198/416

[56] References Cited

U.S. PATENT DOCUMENTS

| | | | |
|---|---|---|---|
| 4,119,194 | 10/1978 | Freeman et al. | 414/798.9 X |
| 4,435,114 | 3/1984 | Fardin | 414/798.9 |
| 4,509,735 | 4/1985 | Kosner | 271/150 X |
| 4,701,094 | 10/1987 | Courjaret et al. | 414/798.9 X |
| 4,867,430 | 9/1989 | Volat | 271/150 X |
| 5,092,574 | 3/1992 | Braen et al. | 271/150 X |

FOREIGN PATENT DOCUMENTS

| | | |
|---|---|---|
| 714798 | 11/1968 | Belgium . |
| 565224 | 11/1932 | Germany . |
| 286586 | 1/1971 | U.S.S.R. .................. 198/416 |

Primary Examiner—William A. Grant
Attorney, Agent, or Firm—Frishauf, Holtz, Goodman & Woodward

[57] ABSTRACT

A suction-free singler and a method for advancing and separating stacked articles includes a feeding conveyor in which the stacked articles are positioned in tandem and side-by-side adjacent to each other in a conveying direction of the feeding conveyor; at least one barrier for intercepting the articles; an extractor for sideways extracting each article in the stack sequentially intercepted by the barrier; and a receive and move apparatus designed to sequentially receive each article extracted from the feeding conveyor and to place the extracted article horizontally on another conveyor so that a largest face of the articles lies on the another conveyor, and the another conveyor moves the extracted articles away from the feeding conveyor.

20 Claims, 1 Drawing Sheet

SINGLER FOR ADVANCING AND DIVIDING STACKED ARTICLES

FIELD OF THE INVENTION

The present invention relates to a singler device for advancing and dividing stacked articles. The term "singler" is used herein to designate a separating apparatus for separating a single article from a stack or other group of articles.

DESCRIPTION OF THE PRIOR ART

It is known, in various fields, such as sorting apparatus and/or making up of parcels in general, that singlers can be used for separating, from a stack of articles, a single article on which other additional operations are to be performed such as labelling, stamping and the like.

The prior art devices generally use vertical loaders. The stacks of articles are introduced into the vertical loaders and are maintained vertically by sliding guides of the loaders. The articles therefore are piled on top of each other and overlap each other. At the bottom of each loader, suitable extraction means operates to take out the article which is at the lowest position through an opening provided in the loader itself that is suitably dimensioned, so that only one article at a time can pass through the opening and hence no more than one article at a time is ejected.

The known devices outlined above, however, have some serious shortcomings.

First of all, as the weight of each article weighs upon underlying articles, especially if such weight is not small, in order to prevent a maximum load on the article located at the lowest position, from being an excessive value, it is necessary to limit the number of articles which can be stacked vertically. Only in this manner can damage to the articles be avoided as ejection operations are carried out by the extracting means which has to drag to the outlet opening the article at the bottom, with a sufficient force to overcome frictional forces created by the load of the stacked articles stacked above the bottom article to be ejected. The friction force opposes the ejecting motion.

In attempting to solve this problem, devices have been proposed in which the next to last object of the stack, i.e. the article atop the bottom article which has to be ejected, is blocked by gripping members designed to hold the weight of the stack during ejection. This expedient, however, remarkably complicates the structure of the devices. In addition, the number of articles that can be held in the stack has a limitation correlated to the effectiveness of the gripping members.

Moreover, these known prior art devices are each designed for only a single class of articles having common dimensions both because the extraction opening has a fixed and rigid contour, and because of the size of the loader itself. In actual use, it is therefore necessary with these prior art devices to carry out, as required, time consuming complicated adjusting operations to adapt the device to handle various other dimensional classes of articles which are intended to be sorted or separated.

SUMMARY OF THE INVENTION

It is an object of the present invention to provide a singler for advancing and dividing (or separating) stacked articles, which singler is capable of substantially overcoming the above-mentioned shortcomings of the prior art.

It is another object of this invention to provide a device which has no limitation as to the number of stacked articles to be separated and which permits a higher separating speed.

Another important object of the invention is to provide a device having a very high operational flexibility, i.e. that permits fast and convenient advancing and dividing of articles which belong to different dimensional classes.

The aforesaid objects are achieved by a singler for advancing and dividing stacked articles that comprises: a feeding conveyor in which the stacked articles are stacked in tandem to rest on edge portions of each article and each article is supported on different portions of the feeding conveyor; at least one barrier for intercepting the articles, arranged above a downstream portion of the feeding conveyor, the at least one barrier being positioned in a transverse direction to a conveyance direction of said feeding conveyor; extracting means for extracting sideways from said feeding conveyor each article in the stack that is sequentially intercepted by said at least one barrier; and an apparatus designed to receive and move each article extracted by said extracting means, away from said extracting means.

BRIEF DESCRIPTION OF THE DRAWINGS

A preferred embodiment of a device in accordance with the invention will now be described, with reference to the attached drawing which shows, in a perspective view with portions broken away, the device according to the invention.

DETAILED DESCRIPTION

Figure 1:
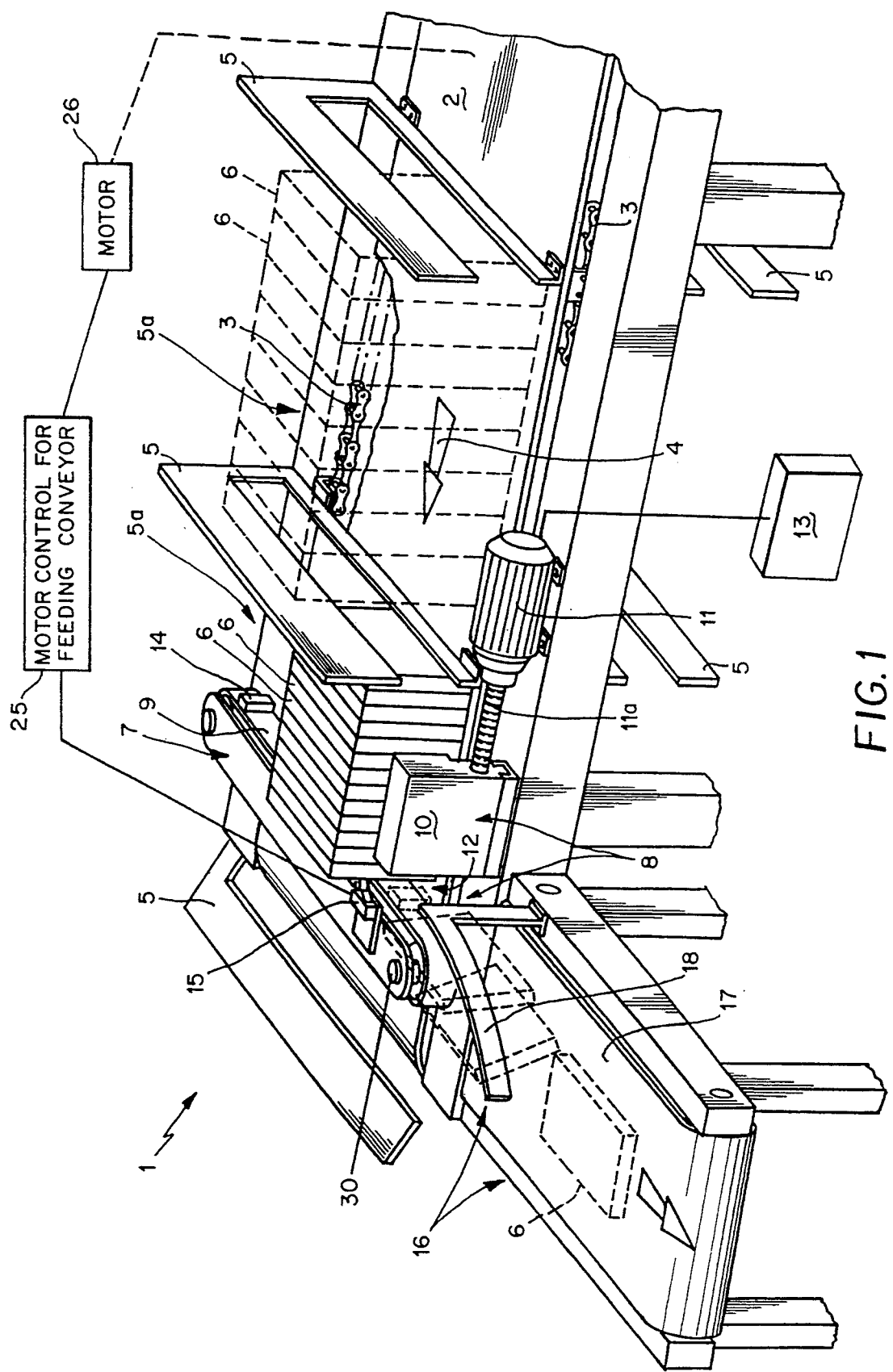

With reference to the sole figure in the drawings, the device in accordance with the invention is designated as a whole by reference numeral 1.

The device comprises a feeding conveyor 2, comprising for example a pair of chains 3, movable in a feed direction shown by arrow 4 by a motor 26.

Associated with chains 3 are subdividing elements 5. An article receiving area or space 5a is defined between two adjacent dividers or bulkheads 5 into which stacked articles 6 are placed edgeways in tandem to flank each other (i.e., to be adjacent each other horizontally). In each area 5a, only articles belonging to a common dimensional class are loaded.

Since several dividing elements or bulkheads 5 are engageable by chains 3, the device 1 enables the handling of articles belonging to different dimensional classes.

Extending transversely across the feeding conveyor 2 is a cantilevered barrier 7 for intercepting the articles 6 transported by the feeding conveyor 2. Provided at the barrier 7 is a device 8, including a movable member 10 for defining an opening through which articles 6 are extracted sideways from the feeding conveyor 2. Each of the articles 6 is intercepted sequentially by the barrier 7 itself. More precisely, the barrier 7 comprises an endless flexible transmission element 9, e.g. a belt, driven by a motor (not shown). The movable element 10 is driven by an electric motor 11 through a worth screw 11a and is designed to define a variable sized passage-port 12 near the transmission element or belt 9.

The variable sized passage-port 12 can be varied in an opening size thereof by varying the position of the movable element 10 and is adjustable in relation to the dimensional class of the articles contained in the area or space 5a adjacent to the barrier 7.

A control unit 13 is provided, by means of which it is possible to program the width (size) of the passage-port 12 in relation to the dimensional class of articles 6 contained in each space 5a. Suitable sensors, e.g. photocells, which are not shown since they are conventional and known per se, can be used for detecting the progressive passage of a bulkhead 5 at a predetermined point and, consequently, indicating the movement of space 5a containing the articles 6 to be sorted at the device 8. Moreover, applied to the transmission element or belt 9 is at least one projection 14 projecting from the belt itself by an amount which is less than a thickness of the thinnest article 6, so as to contact and move during the motion of belt 9 only an article 6 abutting the projection 14. A sensor 15, located near the barrier 7, starts up the motion of belt 9 when it senses the presence of an article approaching or contacting the belt 9 itself.

As shown in the drawing, subdividers or bulkheads 5 are preferably have a substantially oblong C-shape and extend in a direction transverse to the feeding conveyor 2 so as not to interfere with the barrier 7 during the feed motion of the feeding conveyor 2 itself. The end of the barrier 7 closest to the turn-over guide 18 is mounted to the frame of feeding conveyor 2 in a known manner, such as with a bolt 30, so that the end of the barrier 7 furthest from the turn-over guide 18 is left unattached to the frame of the conveyor 2. The free end of the barrier 7 is thus suspended above the conveyor. Barrier 7 is mounted in a cantilever fashion, i.e., it is supported at one side only, and its dimension is such that it can pass through the open slot or channel of the C-shape of the bulkheads 5. The subdividers or bulkheads 5 are designed to move over the barrier 7 as the articles 6 are being sorted. Subdividers 5 remain on the feeding conveyor 2 as can be seen by the two barriers 5 on the underside of feeding conveyor 2. The subdividers or bulkheads 5 can be adjustably moved on the feeding conveyor 2 in accordance with the number of articles that are to be included in a stack.

Provided at a side of the feeding conveyor 2 and near the device 8 is a receive and move apparatus 16. Receive and move apparatus 16 includes conveyor 17 which is designed to receive articles 6 and move them away from device 8. The receive and move apparatus 16 also includes turn over guide 18 which is designed to arrange the articles 6 respectively in a horizontal orientation on conveyor 17 to be flat on a largest face of the article 6. In this manner, articles 6 can assume an optimal orientation with regard to their subsequent engagement at other workstations, such as e.g. labelling or stamping units or the like, which are operating downstream of the device 1 with reference to the feed direction of the articles themselves.

The receive and move apparatus 16 comprises conveyor 17 and turn over guide 18 designed to overturn each article ejected by the device 8, i.e. to lay the largest face of the article 6 on the conveyor 17.

A detailed step-by-step description of the operation of the above described singler for advancing and dividing articles is as following. First of all, a stack of articles 6 having like dimensions is stacked in tandem (side-by-side) in space 5a in a substantially horizontal plane. In this manner, the weight of each article weighs upon different portions of feeding conveyor 2. If articles disposed in the various spaces 5a belong to different dimensional classes, by use of the control unit 13, connected with sensors 15, the device 8, and more precisely the width of the passage-port 12 defined by the movable element 10, can be programmed so that the width of the passage port 12 corresponds to or is slightly greater than a thickness of the articles 6 positioned in space 5a adjacent to the barrier 7.

As soon as sensor 15 detects the presence of an article approaching or in contact with belt 9, the belt 9 is set in motion after the feeding conveyor 2 is stopped by motor control circuit 25 which is connected to the sensor 15 coupled to the motor 26 which drives the feeding conveyor 2. The projection 14, on belt 9, pushes the article abutting thereon, in a direction transverse to the feed direction 4 towards the receive and move apparatus 16. Upon ejection of said article 6 abutting (or contacting) belt 9, the sensor 15 provides to motor control circuit 25 with a signal indicating that no article 6 is abutting against belt 9. The motor control circuit 25 then enables motor 26 to again drive the feeding conveyor 2. Motor 26 drives the conveyor 2 via the chains 3 in a manner known in the art.

The movable element 10, by adjusting the size of the passage-port 12 to correspond in thickness to the thickness of each article 6, allows the ejection of only the article 6 in contact with the belt 9, and prevents the movement of subsequent articles 6 which tend to be dragged transversely by friction with the article being ejected.

Every article 6 of each stack is thus extracted one-by-one, sideways, from feeding conveyor 2 and then is received and moved away by receive and move apparatus 16 which includes conveyor 17, and turn-over guide 18 which lays the extracted article on a largest face thereof on conveyor 17, as shown by dashed lines in the figure.

The invention offers the following important advantages.

The stacks of articles 6 are disposed in tandem (side-by-side) horizontally on a feeding conveyor 2. In practice, there is no limitation as to the number of articles which can be stacked horizontally, even if the articles in each stack are heavy, since every article 6 will weigh on different portions of the feeding conveyor 2 and will not affect in any way the extraction of articles 6 from space 5a.

Since the articles 6 are not stacked vertically, there is no problem of a stack of articles weighing on, and perhaps damaging, a lower article as may occur in the prior art.

Moreover the adjusting of the device 8, which includes movable member 10 is programmable in advance. This provides a high degree of flexibility of operation, i.e. possibly integrating the singler of the present invention for easily and rapidly advancing, dividing and separating articles of different dimensional classes.

Finally it is important to point out that the particular embodiment illustrated in the drawing is advantageous even in its most specific aspects.

In implementing the invention various different materials, shapes and dimensions can be used based on operational requirements.

Various changes and modifications may be made to the embodiment disclosed in the present invention within the scope of the inventive concept.

I claim:

1. A singler for advancing and separating articles from at least one stack of articles, comprising:

a feeding conveyor for conveying said at least one stack of articles in a conveying direction, said at least one stack of articles being positioned on said feeding conveyor side by side in said conveying direction such that each article is positioned adjacent another article on a different portion of said feeding conveyor;

at least one barrier for sequentially intercepting said articles in said at least one stack of articles, said at least one barrier extending in a transverse direction relative to said conveying direction of said feeding conveyor;

extracting means for sequentially extracting each article in said at least one stack in said transverse direction in which said at least one barrier extends; and receive and move means for sequentially receiving each extracted article in said at least one stack and for moving said articles extracted by said extracting means in a direction away from said extracting means;

said feeding conveyor comprising subdividing means for subdividing said articles into at least one stack, each respective stack containing articles having at least one substantially common dimension;

and wherein:

said extracting means is adjustable to provide a passage-port opening that conforms with the at least one common dimension of said articles in each stack;

said at least one barrier means comprises an endless flexible transmission element arranged on said at least one barrier, said flexible transmission element being actuatable when a sensor senses a presence of one of said articles so as to move said one article toward said receive and move means;

said extracting means includes at least one movable element for defining said passage-port opening;

said passage-port opening is disposed near said flexible transmission element; and said passage-port opening is adjustable in size to conform with said at least one common dimension of said articles in said at least one stack by a movement of said at least one movable element.

2. The singler of claim 1, wherein said endless flexible transmission element is movable in said transverse direction of said at least one barrier.

3. The singler of claim 1, further comprising at least one projection means mounted on said endless flexible transmission element for moving against a first article in a first one of said at least one stack and for moving said first article in said transverse direction as said endless flexible transmission element moves in said transverse direction.

4. The singler of claim 1, further comprising a programmable control means including an adjusting means for adjusting a size of said passage-port opening.

5. The singler of claim 1, wherein said flexible transmission element has a projection portion that contacts and moves said one article.

6. The singler of claim 1, wherein said sensor actuates said flexible transmission element when one of said articles is positioned against said flexible transmission element.

7. The singler of claim 1, wherein:

said at least one barrier extends in a cantilever fashion over said feeding conveyor; and said subdividing means comprises substantially oblong C-shaped bulkheads extending in said transverse direction transverse to said conveying direction of said feeding conveyor so as to not interfere with said at least one barrier.

8. The singler of claim 1, wherein:

said sensor senses contact of the one article with said at least one barrier; and further comprising:

a motor control circuit connected between said sensor and a motor that drives said feeding conveyor for stopping a movement of said feeding conveyor by said motor when said sensor senses said contact of said one article with said at least one barrier.

9. The singler of claim 1, wherein said at least one barrier is arranged at a downstream end portion of said feeding conveyor.

10. The singler of claim 1, wherein the receive and move means comprises:

a guide for guiding each extracted article to lie on another conveyor so that the largest face of each article lies on said another conveyor.

11. A method for advancing and separating articles, comprising the steps of:

conveying said articles on a feeding conveyor in a conveying direction;

arranging said articles in at least one stack on said feeding conveyor such that said articles in said at least one stack are positioned in tandem in said conveying direction on said feeding conveyor such that each article is positioned adjacent another article on a different portion of said feeding conveyor;

positioning at least one barrier in a direction transverse to said conveying direction of said feeding conveyor for sequentially intercepting said articles in said at least one stack of articles;

sequentially extracting each article in said at least one stack in said direction transverse to said conveying direction of said feeding conveyor; and sequentially receiving and moving each of said articles in said at least one stack extracted in said extracting step, in a direction away from said feeding conveyor;

and wherein:

said arranging step comprises subdividing said articles into a at least one stack, each respective stack containing articles having at least one substantially common dimension;

said extracting step comprises adjusting a size of a passage-port opening to conform with said at least one substantially common dimension of said articles in each stack;

said positioning step further comprises providing an endless flexible transmission element on said at least one barrier, said flexible transmission element being actuatable in the presence of one of said articles so as to move said one article toward a position where said one article is received and then moved away from said position during said sequentially receiving and moving step;

said extracting step further comprises providing at least one movable element for adjusting said size of said passage-port opening; and further comprising placing said at least one movable element near said flexible transmission element.

12. The method of claim 11, wherein said positioning step further comprises:

providing at least one projection on said endless flexible transmission element for contacting a first article in a first one of said at least one stack and for moving said first article in said transverse direction when said endless flexible transmission element moves in said transverse direction.

13. The method of claim 11, wherein said positioning step further comprises:
providing at least one projection portion on said flexible transmission element, said at least one projection portion contacting and moving said one of said articles.

14. The method of claim 11, wherein said extracting step further comprises programmably controlling a size of said passage-port opening.

15. The method of claim 11, wherein:
said positioning step comprises positioning said at least one barrier to extend in a cantilever fashion over said feeding conveyor; and wherein
said arranging step further comprises subdividing said plurality of articles into said plurality of stacks by providing subdividing elements which respectively include substantially oblong C-shaped bulkheads that extend in said direction transverse to said conveying direction so as not to interfere with said at least one barrier.

16. The method of claim 11, wherein said positioning step includes providing said at least one barrier at a downstream end portion of said feeding conveyor.

17. The method of claim 11, wherein said sequentially receiving a moving step comprises:
guiding each article extracted from said feeding conveyor to lie on another conveyor so that a largest face of each article lies flat on said another conveyor.

18. The method of claim 11, further comprising the step of:
sensing said one article with a sensor mounted on said at least one barrier; and wherein
said positioning step further includes actuating said flexible transmission element when said one article is sensed by said sensor to be adjacent to said flexible transmission element.

19. The method of claim 11, further comprising the step of:
sensing said one article with said sensor; and wherein:
said positioning step includes actuating said flexible transmission element when said one article is sensed to be in contact with said flexible transmission element.

20. The method of claim 19, further comprising:
providing a motor control circuit between said sensor and a drive motor that drives said feeding conveyor for stopping a movement of said feeding conveyor by said motor when said sensor senses said contact between said one article and said flexible transmission element.

* * * * *